(No Model.) 3 Sheets—Sheet 1.

E. WALLACE.
STREET SWEEPING MACHINE.

No. 485,727. Patented Nov. 8, 1892.

Witnesses
J. E. Tyrple
C. J. Hawley

Inventor
Eugene Wallace.
By Paul A. Merwin
Atty's.

THE NORRIS PETERS CO., PHOTO-LITHO., WASHINGTON, D. C.

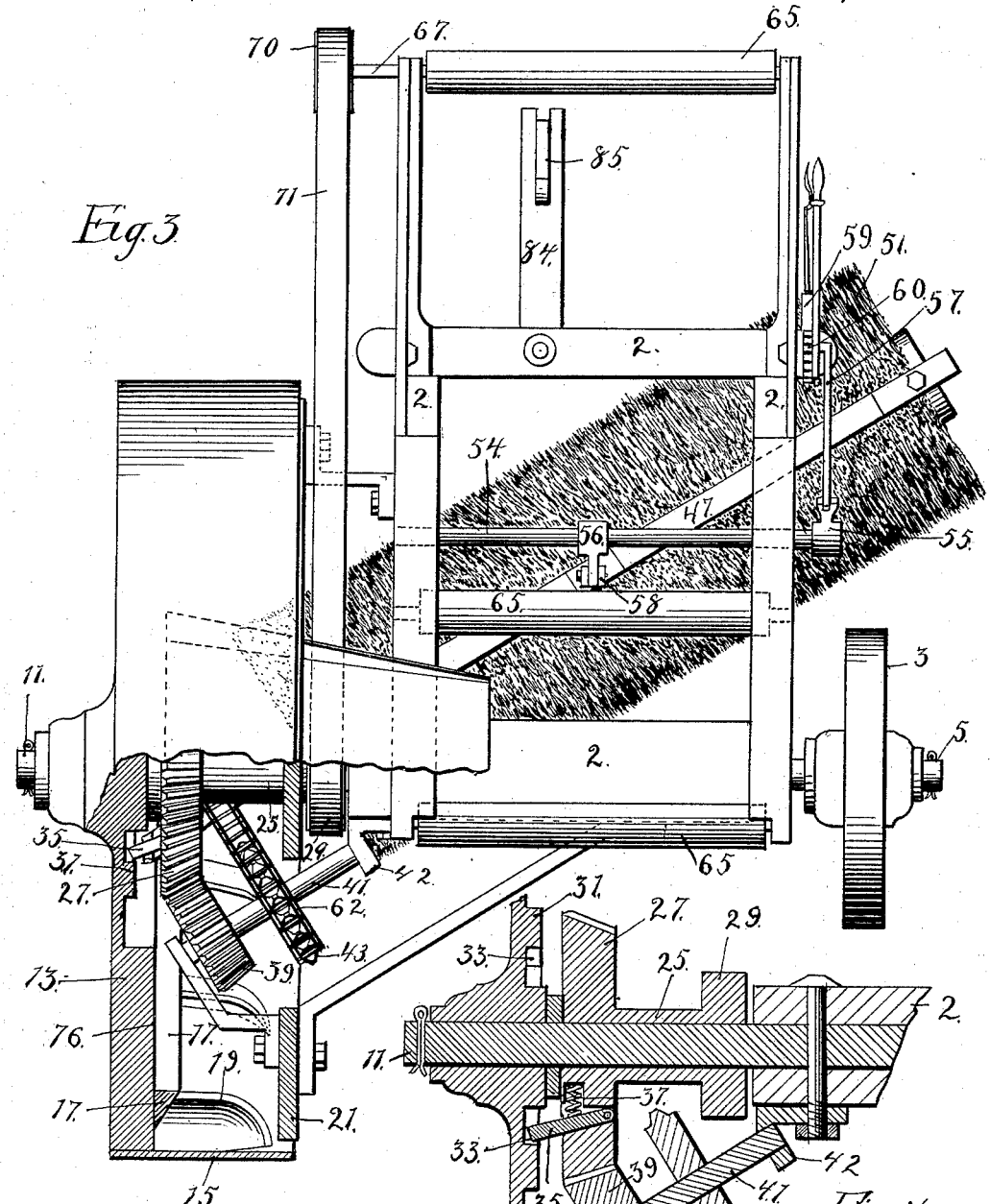

(No Model.) 3 Sheets—Sheet 3.

E. WALLACE.
STREET SWEEPING MACHINE.

No. 485,727. Patented Nov. 8, 1892.

Witnesses
G. E. Purple
O. F. Hawley

Inventor
Eugene Wallace
By Paul & Merwin
Atty's

THE NORRIS PETERS CO., PHOTO-LITHO., WASHINGTON, D. C.

UNITED STATES PATENT OFFICE.

EUGENE WALLACE, OF MINNEAPOLIS, MINNESOTA.

STREET-SWEEPING MACHINE.

SPECIFICATION forming part of Letters Patent No. 485,727, dated November 8, 1892.

Application filed August 14, 1891. Serial No. 402,625. (No model.)

*To all whom it may concern:*

Be it known that I, EUGENE WALLACE, of Minneapolis, in the county of Hennepin and State of Minnesota, have invented a certain Improved Street-Sweeping Machine, of which the following is a specification.

The objects of this invention are to provide an improved street-sweeping machine by means of which the material swept up from the street will be gathered up and deposited in a suitable cart or receptacle; and the invention consists generally in constructing a machine with a main driving-wheel that is provided upon its inner circumference with a series of buckets or flights and arranging the brush so that the material will be swept directly into this wheel and lodged in said buckets or flights, so that it will be carried up by said wheel and deposited in a suitable carrier or conveyer and thence carried to the cart or receptacle in which it is to be deposited.

The invention consists, further, in the construction and combinations hereinafter described, and particularly pointed out in the claims.

The invention will be more readily understood by reference to the accompanying drawings, forming a part of this specification, and in which—

Figure 1:
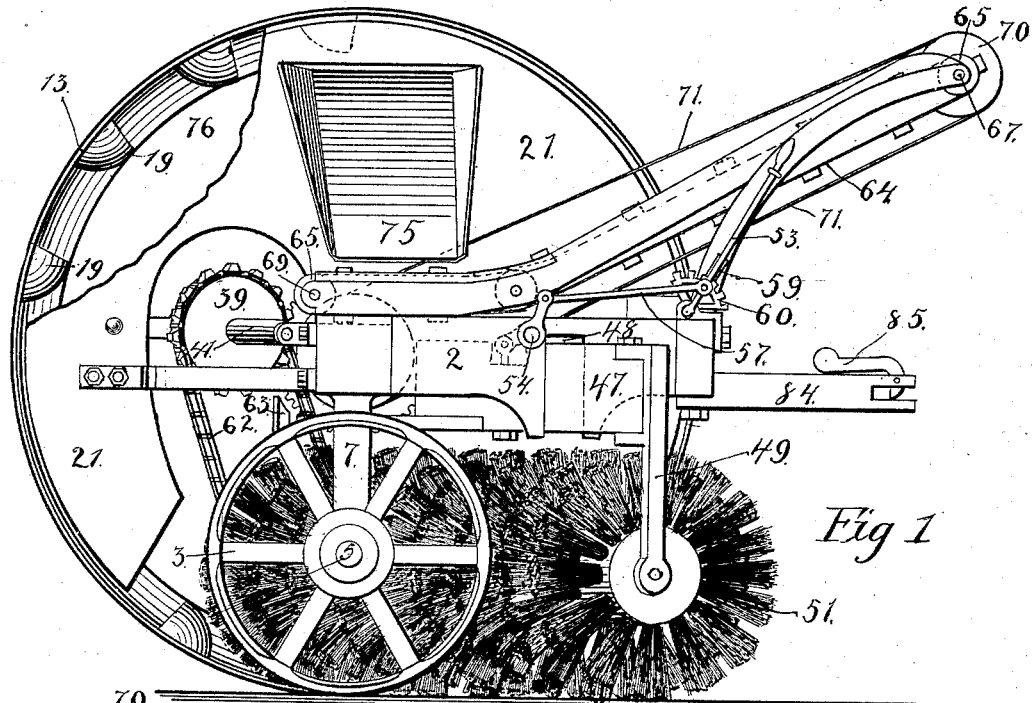
Figure 2:
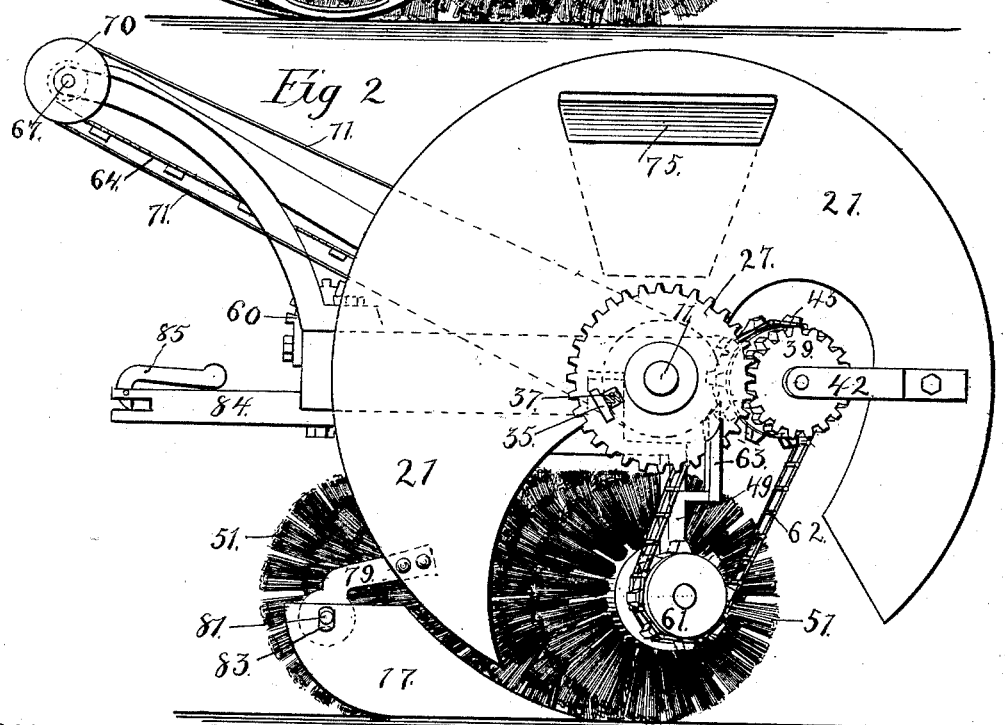
Figure 5:
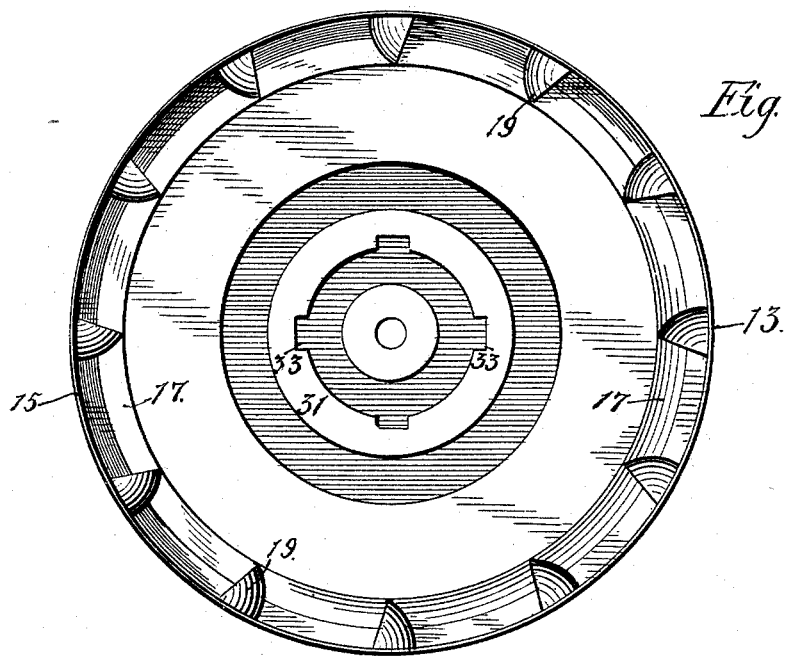
Figure 6:
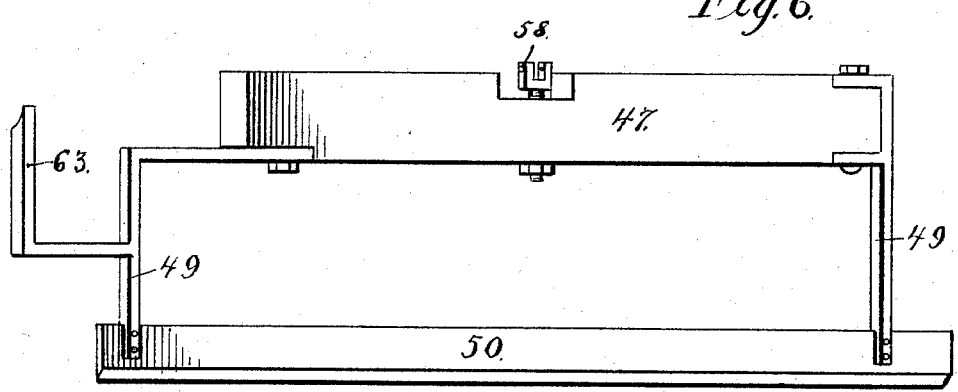

Figure 1 is a side elevation of a machine embodying my invention. Fig. 2 is a view of the opposite side with the driving-wheel removed. Fig. 3 is a plan view of my machine, a portion of the same being broken away to show the construction of the driving-wheel and the means for driving the brush. Fig. 4 is a horizontal sectional detail of the driving and clutch mechanism. Fig. 5 is an interior view of the driving-wheel. Fig. 6 illustrates a scraper to be substituted for the revolving brush.

As shown in the drawings, 2 represents the frame of the machine, which may be of any suitable size and construction, and is supported at one end upon the small wheel 3, that runs upon an axle 5, secured to the frame of the machine by the brace 7. This wheel simply runs freely upon the axle 5 and supports one side of the machine. The other side of the machine is provided with the axle 11, upon which is mounted the main driving and elevating wheel 13. This wheel is provided with the broad tire or flange 15, that projects inwardly from the outer circle of the wheel, and is provided upon its inner surface with a series of buckets or flights 19. A suitable rib 17 projects from the inner surface of the wheel at the inner end of the flights, and forms a channel on the inner surface of the wheel, extending from one flight to the next, thereby aiding in directing all the material into the flights and holding it therein as the flights are elevated. A stationary disk 21 is secured upon the frame of the machine at the inner edge of the rim or flange 15. This disk is cut away at its lower portion, so as to permit the material that is swept up by the brush to be moved through this opening to the interior of the wheel, and thus enter the buckets or flights, as hereinafter described. Arranged upon the axle 11 is the loose sleeve 25, having secured thereon within said wheel a gear 27, said sleeve being also preferably provided at a point outside the disk 21 with a pulley 29. The inner surface of the wheel 13 is provided with the ring 31, having therein a series of notches 33. The gear 27 is provided with a removable lug 35, and a spring 37 engages this lug and tends to throw it out into one of the notches 33 in the ring 31. When the lug 35 is in engagement with the walls of one of the notches 33 and the machine is in motion, the gear 27 and the sleeve 25 will be rotated from the driving-wheel 13. The gear 27 meshes with a pinion 39, mounted upon a short shaft 41, arranged in suitable bearings 42 upon the disk 21 and the frame of the machine. A sprocket-wheel 43 is also provided on the shaft 41. Extending diagonally across the machine and beneath the frame thereof is the brush-frame 47, provided with hangers 49, in which is journaled a rotating brush 51. The frame 47 is arranged in bearing slots or guides 48 in the side beams of the frame of the machine (see Fig. 1) and is adapted to slide vertically in its said bearings. For the purpose of raising and lowering the brush 51 I provide the lever 53 on the side of the frame and the rock-shaft 54, extending transversely across the frame. Upon the rock-shaft I provide the two crank-arms 55 and 56, respectively, connecting the first with the lever 53 by the rod 57 and the latter to the diagonal bar 47 of the frame by the bolt or rod 58, and by means of said lever the frame may be raised or lowered, as desired, and locked in position by means of the latch 59 on the lever and the notched quadrant 60, provided on the frame, as shown in Figs. 1 and 3. The axle of the brush is provided with a suitable sprocket-wheel 61, and this is connected by a chain 62 with the sprocket-wheel 43 upon the shaft 41. The brush-frame 47 is provided with the projecting shipper-arm 63, which projects within the rim of the driving-wheel to a point beneath the gear 27. When the brush-frame is raised so as to bring the brush clear from the ground or pavement, this shipper-arm is brought into the position shown by dotted lines in Fig. 2, in which position it is engaged by the movable lug 35, and said lug is thereby moved inward, so as to withdraw the same from the notch 33 of the driving-wheel, and the lug is thereafter held in that position, so that as the device is moved along none of the mechanism is operated, the drive-wheel running free from all the other parts. Supported upon the frame of the machine is an endless belt-carrier 64, this carrier preferably extending in an inclined direction toward the front of the machine, being secured at its ends on rollers 65, mounted upon suitable shafts 67 and 69, and the shaft 67 is provided with a pulley 70, that is connected by a belt 71 with the pulley 29 on the sleeve of the shaft 41. By this means whenever the brush is in operation the carrier 64 is driven from said shaft 41. It will be seen that as the wheel 13 is rotated when the buckets or flights approach the top of the wheel they are inverted and the material in them falls out. I provide a spout 75, secured upon the disk 21 and extending through an opening in said disk to a point within the rim 15. The lower end of this spout extends over the carrier 64, and its upper end extends under the rib 17 close to the inner surface 76 of the wheel 13. The outer edge of the rib is curved or beveled, so that the material on top of said ledge slides therefrom onto the spout 75, and this ledge prevents any of the material from dropping down between the wheel and the end of the spout. In place of using the rotating brush 51 I may substitute a scraper 50, which will be secured upon the hangers 49 of the brush-frame 47, as shown in Fig. 6. For the purpose of preventing any of the dirt from being thrown by the brush or scraper in front of and under the drive-wheel I provide the vertical and longitudinal shoe 77, that is arranged directly under and in the same vertical plane with the disk 21 and is secured to an arm 79, that is fastened to said disk. The pin 81 of the arm 79 enters a vertical slot on the top of the shoe 77.

In operation as the machine is drawn over the street or pavement the brush, being rotated, sweeps up the dirt and sweeps it directly through the opening in the disk 21 into the lower part of the driving-wheel, so that it rests upon the rim or flange 15. As the wheel rotates the material enters the flights or buckets 19, and is carried up by said buckets until they arrive at the top of the wheel, when the material drops out of the buckets or flights onto the spout 75 and down the same and drops upon the carrier 64, by which it is carried along and deposited in a cart or other receptacle placed on or in front of the machine. The machine is preferably provided with a short tongue 84, having a lock 85, by means of which the machine may be secured to the rear end of a cart.

I claim as my invention—

1. The combination, in a machine of the class described, with the frame and the angularly-placed dirt-collector, of the driving-wheel provided with an inwardly-projecting flange, a series of buckets upon the inner surface of said flange, a spout projecting within said flange at the upper part of said wheel, and an upwardly-projecting driven carrier adapted to receive material from said spout, substantially as described.

2. In a machine of the class described, the combination, with the machine-frame, of the brush-frame 47, mounted thereon, means for raising and lowering said brush, the driving-wheel, a connection between said driving-wheel and said brush, whereby said brush is driven from said driving-wheel, and means for disconnecting said brush from said driving-wheel as said brush is raised, substantially as described.

3. In a machine of the class described, the combination, with the machine-frame, of the brush mounted thereon, the driving-wheel provided with the inwardly-projecting flange, and the disk 21, arranged outside of said flange and provided with an opening in its lower portion, through which material is passed from said brush to the inner surface of said driving-wheel.

4. In a machine of the class described, the combination, with the frame of the machine, of the driving-wheel provided with the notched ring 31, the gear 27, having a spring-controlled lug adapted to engage the notches in said ring, the movable brush-frame, the brush mounted thereon and the shipper-arm arranged upon said brush-frame and adapted to engage the lug on the gear 27 and disconnect the same from the driving-wheel when the brush-frame is raised, and means connecting said gear 27 with said brush.

5. The combination, with the frame of the machine, of the brush mounted thereon, the wheel provided with the inwardly-projecting flange 15, the buckets 19 upon the inner surface of the said rim, the rib 17, and the inclined spout 75, having its upper end extending into said driving-wheel beneath said rib 17, substantially as described.

6. The combination, in a street-sweeper, of the machine-frame with a brush-frame vertically adjustable with respect to the same and secured thereto, a cylinder brush arranged therein to sweep the pavement, a sprocket-wheel upon the brush-shaft, a gear, a suitable clutch device for connecting the same with the drive-wheel, a pinion meshing with the said gear, a sprocket in connection therewith, and a sprocket-belt passing over the same and the sprocket of the brush, said drive-wheel provided with a flange 15, having on its inner surface a series of equidistant buckets, a spout projecting within said flange to receive the dirt from said buckets, and a driven carrier-elevator adapted to receive the dirt from said spout, substantially as described.

7. The combination, in a machine of the class described, of the machine-frame with the brush-frame secured thereon, the cylindrical brush therein, the drive-wheel having the flange 15, buckets arranged in the inner side of said flange, a gear-wheel, a clutch device in connection therewith to engage the drive-wheel, a gear-pinion meshing with said gear-wheel, means for disposing of the dirt elevated by the buckets, and means for raising or lowering the brush, substantially as described.

8. The combination, with the drive-wheel provided with the flange 15, having the inclined buckets 19, of the annular rib 17, arranged on the inner part of the drive-wheel and projecting inwardly from the surface thereof, a dirt-collecting device to gather the dirt into the lower part of the drive-wheel, a disk 21, covering the inner face of the drive-wheel and having an opening in its upper portion, a downspout projecting from the said opening and inside said annular rib, and an opening in the lower portion of said disk 21, through which the dirt is swept into the flanged driving-wheel, all substantially as and for the purpose specified.

9. The combination, with the frame of the machine, of the large flanged wheel provided with a series of buckets, a dirt-collector arranged diagonally across said machine and adapted to carry the dirt into said flanged wheel, means for disposing of the dirt lifted by said buckets, a stationary disk 21, closing the inner side of the driving-wheel, the shoe 77, arranged in a vertical plane therewith and provided with the slot 83, the arm 79, extending from the disk 21, and a pin in said arm to enter said slot 83, as and for the purpose specified.

In testimony whereof I have hereunto set my hand this 8th day of August, 1891.

EUGENE WALLACE.

In presence of—
FRED S. LYON,
J. JESSEN.